United States Patent

Ishimatsu et al.

[11] Patent Number: 5,956,314
[45] Date of Patent: Sep. 21, 1999

[54] SHOCK ABSORBING DEVICE AND RECORDING/PLAYBACK APPARATUS FOR DISC-SHAPED RECORDING MEDIUM EMPLOYING THE SHOCK ABSORBING DEVICE

[75] Inventors: Yoshikazu Ishimatsu; Akira Suzuki; Atsuyuki Ukai, all of Kanagawa, Japan

[73] Assignee: Sony Corporation, Tokyo, Japan

[21] Appl. No.: 08/314,933

[22] Filed: Sep. 29, 1994

Related U.S. Application Data

[63] Continuation of application No. 08/072,536, Jun. 4, 1993, abandoned.

[30] Foreign Application Priority Data

Jun. 5, 1992 [JP] Japan .................................... 4-169953

[51] Int. Cl.⁶ .................................................. G11B 17/00
[52] U.S. Cl. .................................................. 369/247
[58] Field of Search .................................... 369/247, 248, 369/263, 75.1; 360/97.02; 267/136, 152, 166, 141.4

[56] References Cited

U.S. PATENT DOCUMENTS

| | | | |
|---|---|---|---|
| 4,005,858 | 2/1977 | Lochner | 267/136 |
| 4,633,973 | 1/1987 | Kitano | 369/248 |
| 4,731,777 | 3/1988 | Yoshitoshi et al. | 369/248 |
| 4,794,588 | 12/1988 | Yoshitoshi et al. | 369/247 |
| 4,812,932 | 3/1989 | Hishinuma et al. | 360/98.01 |
| 4,831,476 | 5/1989 | Branc et al. | 360/97.02 |
| 4,922,478 | 5/1990 | Verhagen | 369/247 |
| 5,042,024 | 8/1991 | Kurosawa et al. | 369/75.1 |

FOREIGN PATENT DOCUMENTS

| | | | |
|---|---|---|---|
| 0206983 | 8/1988 | Japan | 369/263 |
| 1494033 | 7/1989 | U.S.S.R. | 369/75.1 |
| 2244111 | 11/1991 | United Kingdom | 267/136 |

Primary Examiner—Brian E. Miller
Attorney, Agent, or Firm—Limbach & Limbach L.L.P.

[57] ABSTRACT

A shock absorber for a disc recorder/player, the shock absorber including a rubber tubular member mounted between the recorder/player's driving unit and the recorder/player's casing and having at least a pair of wall sections and a hollow section, and a compression spring interposed within the hollow section, the wall sections being arrayed along a first axial direction corresponding to the direction of movement of the recorder/player, with the direction of movement of an object lens of an optical pickup being a second axial direction and a direction interconnecting the driving unit and the casing being a third axial direction, the hollow section being formed along the second axial direction and the compression spring being arrayed so that the direction of the longitudinal axis thereof is aligned with the third axial direction.

18 Claims, 10 Drawing Sheets

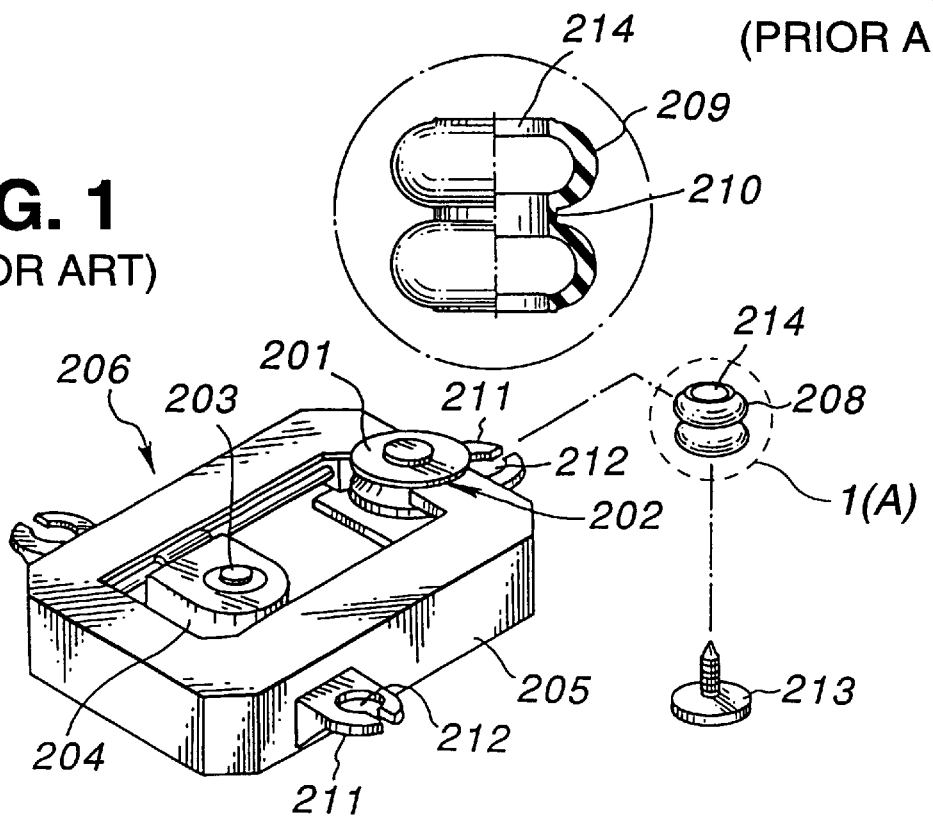
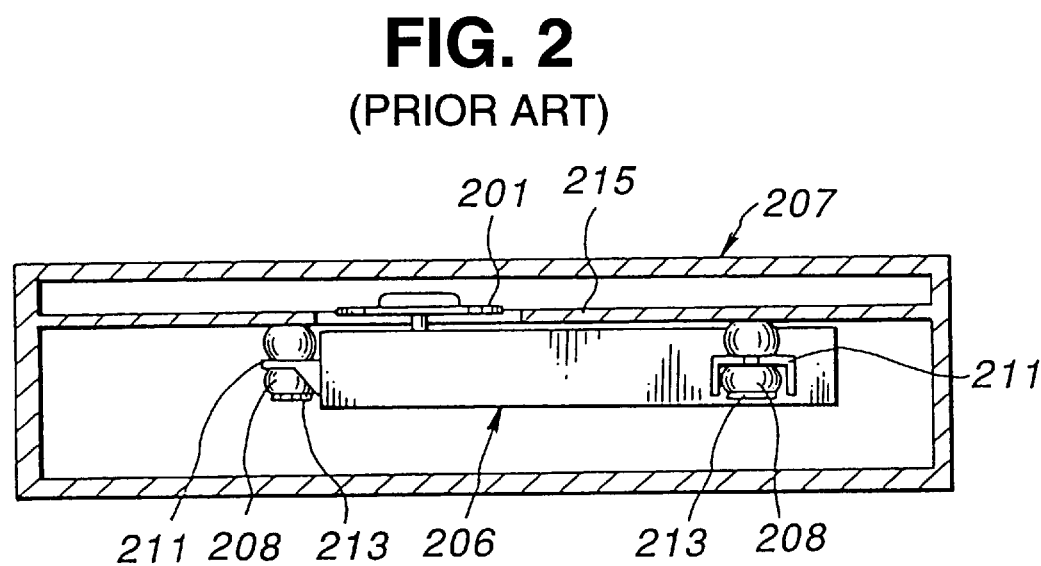

SHOCK ABSORBING DEVICE AND RECORDING/PLAYBACK APPARATUS FOR DISC-SHAPED RECORDING MEDIUM EMPLOYING THE SHOCK ABSORBING DEVICE

This is a continuation of application Ser. No. 08/072,536 filed on Jun. 4, 1993 now abandoned.

BACKGROUND OF THE INVENTION

This invention relates to a shock-absorbing device mounted between a vibration source member and a member to be set into vibration, and a recording/playbacK apparatus for a disc-shaped recording medium employing such shock-absorbing device.

Recently, as the disc-shaped recording media, read-only optical recording media, commonly termed CD-ROM, re-recordable optical recording media and magneto-optical recording media, which may be re-recorded by light or magnetic field modulation, have been proposed. Currently, the CD-ROM and magneto-optical recording media have been put to practical application.

By way of an example, reference is had to the CD-ROM, referred to herein as an optical disc. As a playback apparatus for this optical disc, the following arrangement, which may be reduced in size and may be adapted to various loading systems, represented by a caddie system, a tray system or a top-up system, subject to simple design change, has been proposed.

Referring to FIG. 1, the arrangement comprises a driving unit 206, made up of a spindle motor 202 for rotationally driving an optical disc, not shown, loaded on a turntable 201, an object lens 203 movable radially of the optical disc and adapted for reproducing information signals from the disc by means of a light beam and for converging the light beam, and an optical pickup unit 204 mounting the object lens 203 for movement in a direction away from and towards the optical disc. These elements 202 to 204 are housed within a chassis 205 which in turn is housed within a casing 207 of a main body of the reproducing apparatus, as shown in FIG. 2.

The driving unit 206 is mounted within the casing 207 via a damper 208 mounted on the lateral side of the chassis 205 of the driving unit 206. As shown in FIG. 1A, the damper 208 comprises a cylindrical-shaped thin-walled rubber member 209 having a constricted mid portion 210 with rounded upper and lower portions.

For mounting the damper 208 on the chassis 205, the damper 208 is thrust into a hole 212 surrounded by a hook-shaped protrusion 211 formed on the lateral side of the chassis 205 so that the frame portion of the protrusion 211 is engaged with the constricted portion 210 of the damper 208. A set screw 213 is threaded into a tapped hole 214 in the damper 208 from below the damper 208 into threaded engagement with a driving unit attachment plate 215 of the casing 207 for mounting the driving unit 206 in position within the casing 207.

If vibrations or shocks are exerted for some reason on the casing 207 of the reproducing apparatus, energies proper to these vibrations or shocks from the casing 207 are absorbed in the form of shear deformation or compression deformation of the damper 208 itself for reducing the vibrations or shocks transmitted to the driving unit 206.

However, if, under the demand raised by the user, the mounting state of the casing 207, for example, is changed, as when the mounting state of the casing 207 is to be changed from a horizontal position to a vertical position, or when the playback apparatus is adapted as a car-laden device, larger vibrations or shock are exerted on the casing 207.

However, with the above damper 208, since the vibrations or shocks exerted on the casing 207 are absorbed in the form of the deformation, such as shear deformation or compression deformation, of the damper 208 itself, a certain limitation is imposed on the amount of absorption of the damper 208. Consequently, the larger vibrations or shocks produced under the above situation cannot be absorbed satisfactorily. In such case, the result is that the vibrations or shocks are transmitted from the casing 207 to the driving unit 206 to interfere with control of radial movement of the optical disc in the optical pickup unit 204, that is tracking servo control, or focusing servo control of the object lens 203, so that it becomes impossible to reproduce the information from the optical disc reliably.

It may be contemplated to provide a tension spring between the corner of the driving unit 206 and the casing 207 in place of the damper 208 to insulate transmission of the vibrations and shocks from casing 207. However, if the casing 207 is mounted in a vertically directed orientation, that is if the casing 207 is mounted with the optical disc surface parallel to the perpendicular direction, the driving unit 206 tends to be displaced downwards within the casing 207 under the force of gravity. Consequently, if the playback apparatus has a loading unit of the cartridge insertion type caddie system, the cartridge inserting opening in the casing 207 is displaced relative to the driving unit 206, so that the optical disc accommodated within the cartridge main body cannot be loaded on the turntable 201 of the spindle motor 202 in the driving unit 206.

SUMMARY OF THE INVENTION

It is therefore an object of the present invention to provide a shock-absorbing device whereby the vibrations or shocks applied to an outer casing may be prevented from being transmitted to a driving unit.

For accomplishing the above object, the present invention provides a recording and/or reproducing apparatus that includes an optical unit, which is radially movable across a disc, and a driving unit, which positions and rotates the disc. The optical unit, which radiates a laser light beam on a recording surface of the disc, includes a bobbin which is perpendicularly movable with respect to the surface of the disc. The apparatus also includes a chassis that supports the optical unit and the driving unit, and an outer casing. In accordance with the present invention, the apparatus further includes a plurality of dampers which are connected between the outer casing and the chassis. Each damper has a compression spring which provides a first spring constant along a first axis, a second spring constant which is different from the first spring constant along a second axis, and a third spring constant which is different from the first spring constant and the second spring constant along a third axis.

Other objects of the shock absorbing device according to the present invention and the recording and/or reproducing apparatus employing the shock absorbing device will become more apparent from the following description and the drawings.

BRIEF DESCRIPTION OF THE DRAWINGS

FIG. 1 is a perspective view showing a driving unit mounting a conventional damper.

FIG. 1A is a cross-sectional drawing of damper 208.

FIG. 2 is a cross-sectional view showing essential parts of a playback apparatus for an optical disc according to the present invention.

DESCRIPTION OF THE INVENTION

Referring to FIGS. 3 to 14, preferred embodiments of a shock-absorbing device and a recording/playback apparatus for a disc-shaped recording medium employing the shock absorbing device according to the present invention will be explained in detail. The following description is made in connection with a commercial read-only optical recording medium (CD-ROM), referred to herein as an optical disc, as the disc-shaped recording medium, and a playback-only apparatus, referred to herein as a playback or reproducing apparatus, as the apparatus employed for driving the disc-shaped recording medium.

Before proceeding to description of an embodiment of the shock absorbing device of the present invention, an embodiment of a playback apparatus adapted for mounting the shock absorbing device is explained by referring to FIGS. 3 to 9. The playback apparatus includes a so-called caddie type loading mechanism in which a cartridge main body having the optical disc rotatably housed therein may be introduced into the apparatus via a cartridge inserting opening.

Figures 3, 3A:
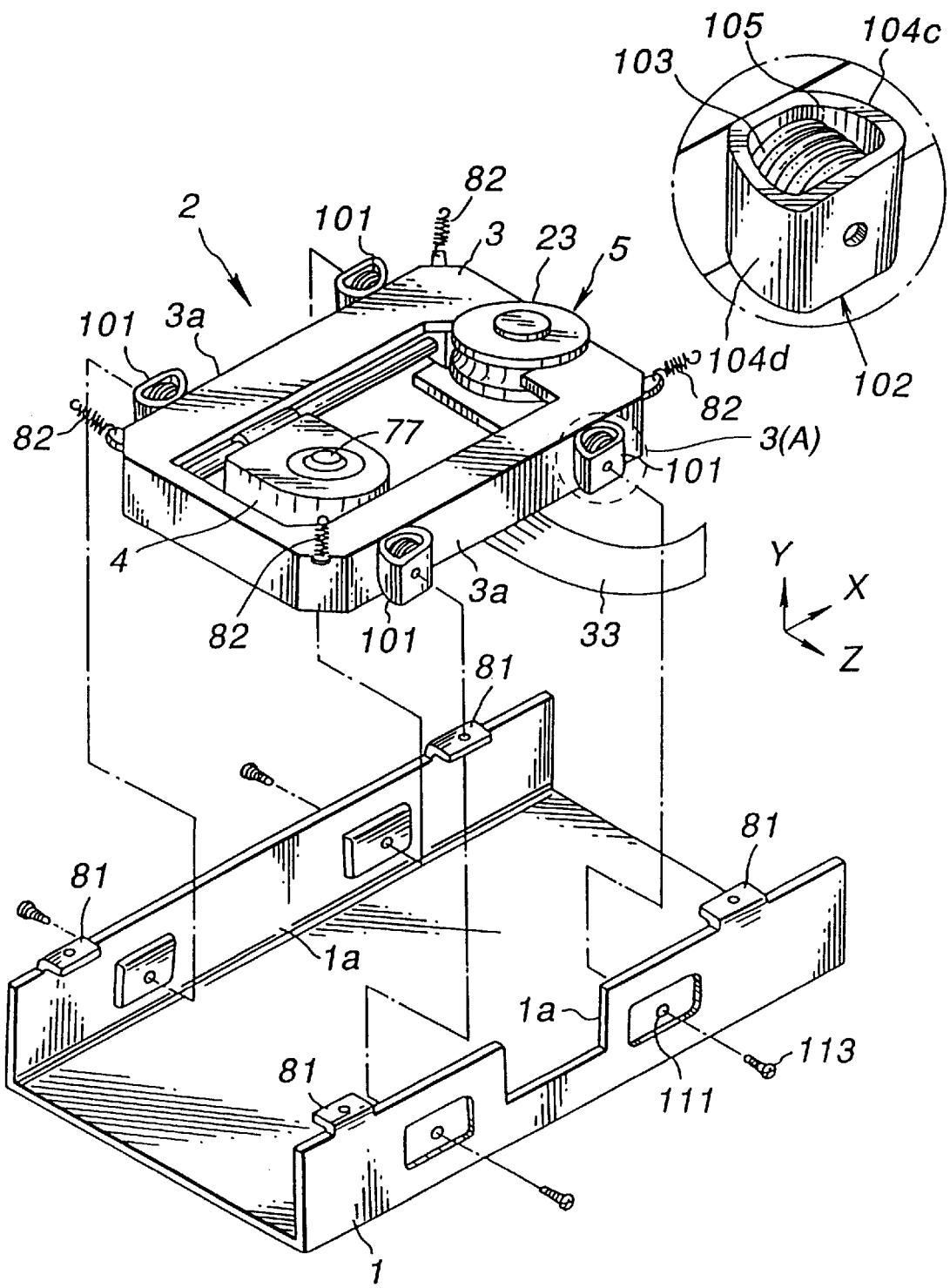
FIG. 3 is an exploded perspective view showing essential parts of a playback apparatus for an optical disc employing a shock-absorbing device according to the present invention.
FIG. 3A is a perspective drawing of shock absorbing device 101 in accordance with the present invention.

Referring to FIG. 3, the playback apparatus includes a box-shaped casing 1 formed by bending a flat metal sheet, and a driving unit 2, as explained subsequently, is housed within the casing 1 in a floating condition. The driving unit 2 includes an optical pickup unit 4 for optically detecting the information recorded on an optical disc, not shown, and transducing the detected information into electrical signals, and a spindle motor 5 for rotationally driving the optical disc.

Figure 4:
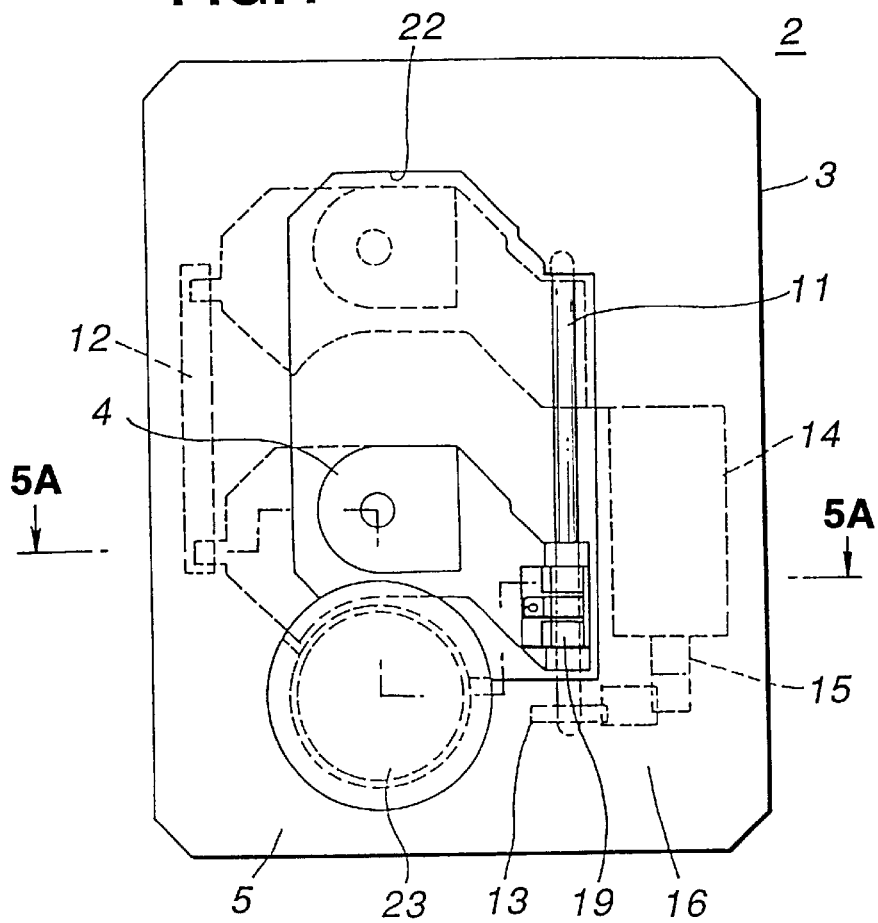
FIG. 4 is a plan view showing an arrangement of a driving unit according to the present invention.

Referring to FIGS. 4 to 7 for more detailed explanation of the driving unit 2, the optical unit 4, as a constituent element of the driving unit 2, is supported on the chassis 3 by a guide shaft 11 and a rail 12 for movement in a direction normal to the track direction of the optical disc, that is in a direction along the radius of the optical disc, as shown in FIG. 4. A gear 13 secured to one end of the guide shaft 11 is engaged via a gear train 16 with a rotary shaft 15 of a motor 14 mounted parallel to the guide shaft 11 on the chassis 3. Consequently, when the rotary shaft 15 of the motor 14 is run in rotation, the force of rotation of the motor is transmitted via gear train 16 to gear 13 of the guide shaft 11 so that the guide shaft 11 is rotated in unison with gear 13.

Figure 6:
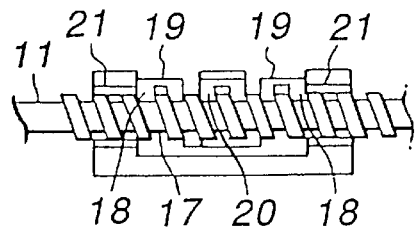
FIG. 6 shows the state of meshing between a guide shaft and an optical pickup device.

A spirally extending flute 17 is cut in the guide shaft 11, as shown in FIG. 6. A supporting plate 19 having projections 18 formed thereon for being engaged with the flute 17 is mounted on the pickup unit 4. The supporting plate 19 is also provided with a lug 20 kept engaged with the flute 17 in the guide shaft 11 under the force of thrust exerted by a spring, not shown, for taking up the backlash due to manufacture tolerances. The optical pickup unit 4 is also provided with a bearing 21 traversed by guide shaft 11. When the guide shaft 11 is run into rotation about its own axis with the rotation of the output shaft 15 of the motor 14, the optical pickup unit 4 is slid by being guided along the spirally extending flute 17 on the guide shaft 11 so as to be moved from the inner rim shown by broken lines in FIG. 4 up to an outer rim shown by a solid line in FIG. 4.

Figure 7:
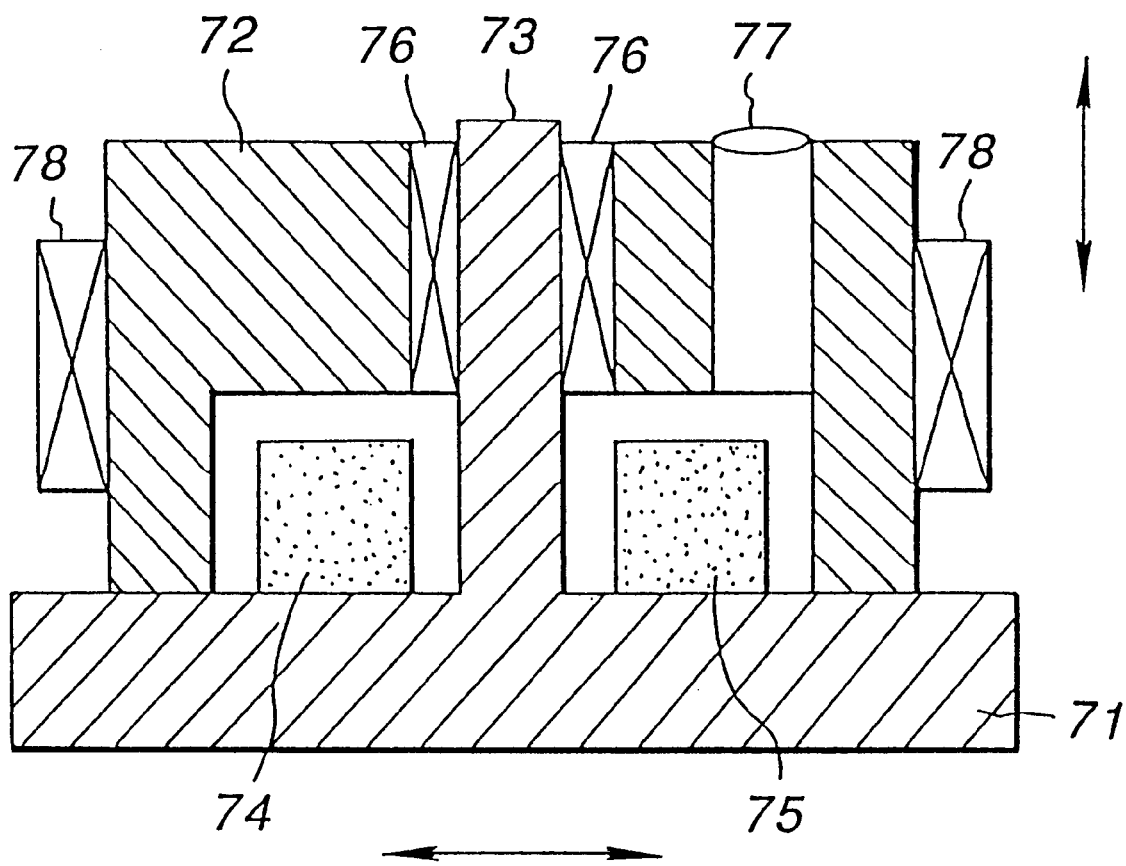
FIG. 7 is a longitudinal cross-sectional view showing a basic structure of the optical pickup unit.

The optical pickup unit 4 itself is basically made up of a base 71 and a bobbin 72, as shown in FIG. 7. The base 71 has a central upstanding supporting shaft 73 and a pair of magnets 74, 75 on its upper surface. The bobbin 72 is rotatably mounted via a bearing 76 on the supporting shaft 73 of the base 71, with an object lens 77 mounted at an offset position for facing upwards. A focusing adjustment coil 78 is wrapped around the outer periphery of the bobbin 72.

A magnetic circuit is completed by a focusing adjustment coil 78 and the magnets 74, 75 secured to the base 71. By causing a control current to flow through coil 78, bobbin 72 is moved vertically with respect to the base 71, that is in a direction towards and away from the optical disc, for adjusting the focus of the object lens 77 on the optical disc. Thus the bobbin 72, coil 78 and the magnets 74, 75 make up a focusing servo unit for the object lens 77.

In FIG. 4, rail 12 is outsert-molded on the chassis 3, while means for supporting the guide shaft 11 is similarly outsert-molded to chassis 3. A center aperture 22 is formed in a mid part in the upper surface of chassis 3 such that laser light radiated from optical pickup unit 4 travelling radially of the optical disc is converged by the object lens 77 so as to be radiated via aperture 22 on the optical disc.

Figure 5:
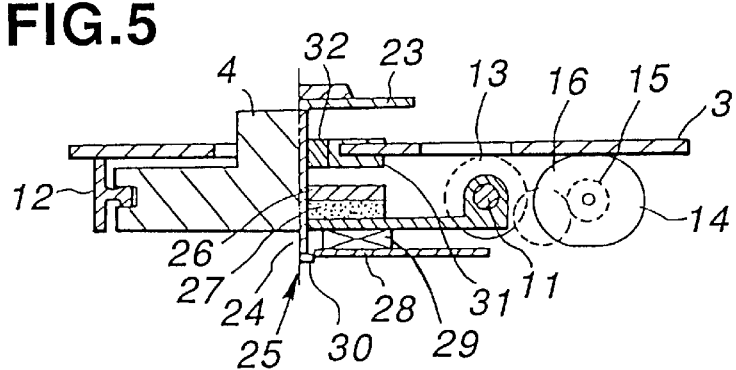
FIG. 5 is a cross-sectional view taken along line 5A—5A in FIG. 4.

The spindle motor 5 is basically made up of a turntable 23 mounting the optical disc and rotary means 25 for rotationally driving a rotary shaft 24 of the turntable 23, as shown in FIG. 5. The rotary means 25 is made up of a yoke 26, a magnet 27 and a coil 29 affixed to a metal sheet base plate 28.

The rotary shaft 24 of turntable 23 has its foremost part rounded and thrust against a thrust support 30 formed e.g. of nylon or the like plastics at a mid part of the sheet metal base plate 28 under the force of attraction exerted between the magnet 27 and the base plate 28. The rotary shaft 24 is rotatably mounted by a bearing 32 embedded in a bearing mounting member 31 outsert-molded on the chassis 3. The above components make up the spindle motor 5 of the present invention.

By supplying current to motor 14 (FIG. 4) and to coil 29 (FIG. 5) via cable 33, as shown in FIG. 3, the optical pickup unit 6 is slid axially of the optical disc, at the same time that the turntable 23 for clamping the optical disc is rotated in one direction.

Figure 8:
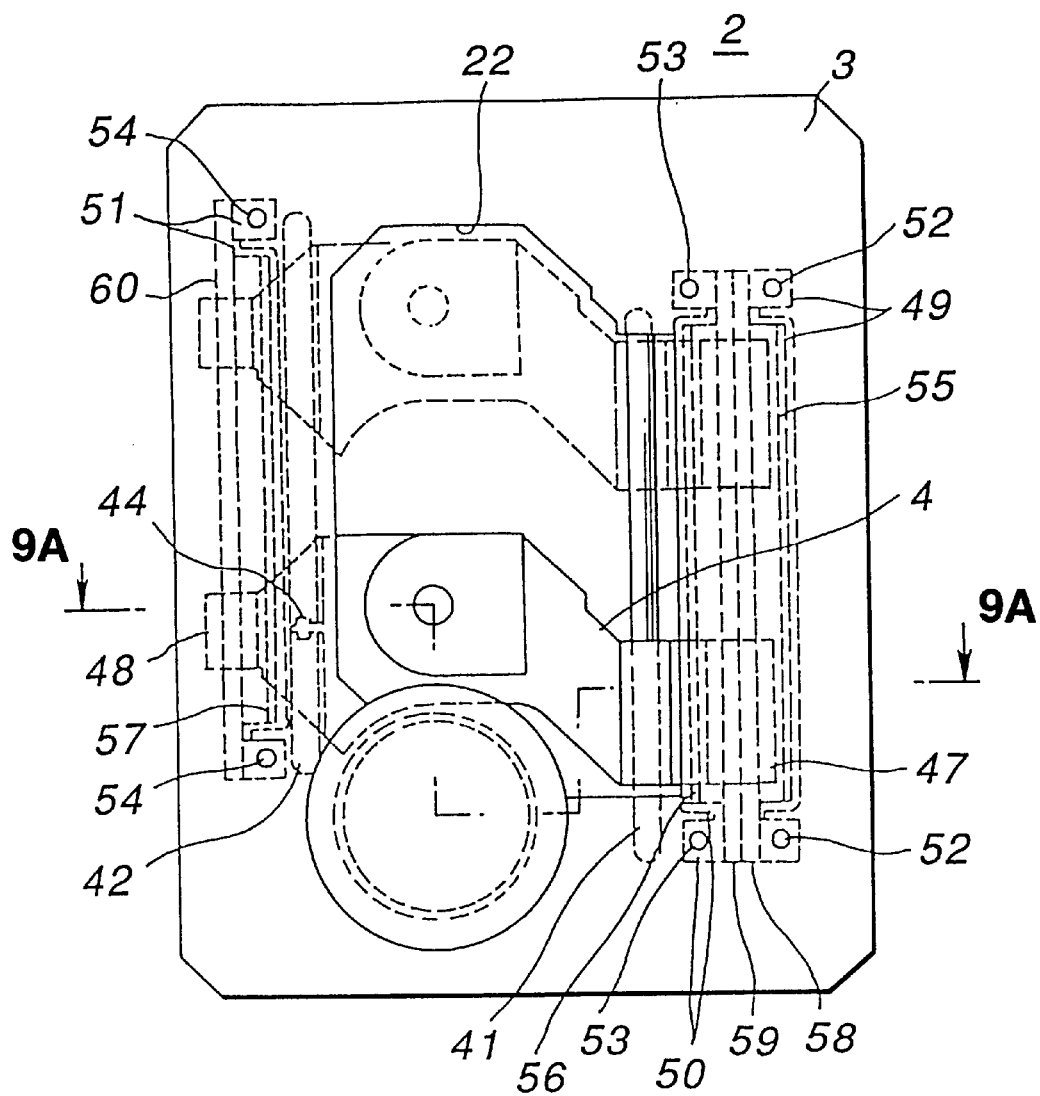
FIG. 8 is a plan view showing a modification of the driving unit according to the present invention.
Figure 9:
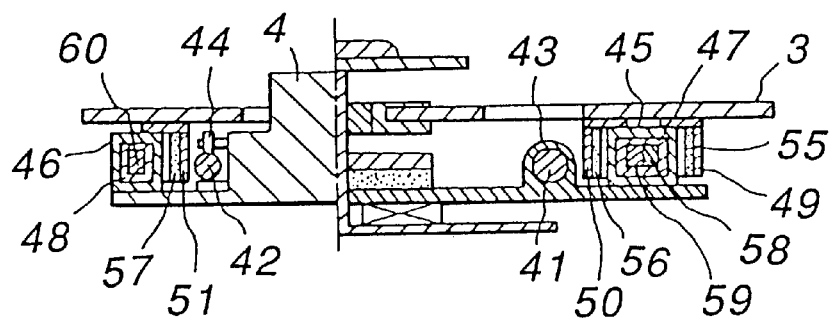
FIG. 9 is a cross-sectional view taken along line 9A—9A in FIG. 8.

Although the optical pickup unit 4 is moved radially of the optical disc by rotational driving of motor 14, the optical pickup unit 4 may be driven by a linear motor, not shown, as shown in FIG. 8 and 9, in which parts or components similar to those shown in Figs.4 to 6 are denoted by the same reference numerals.

In the embodiment illustrated, first and second guide shafts 41, 42 are mounted on the chassis 3 on both sides of and in the vicinity of the aperture 22 in the chassis 3. The optical pickup unit 4 is supported on the chassis by the first and second guide shafts 41, 42 for movement vertically relative to the track of the optical disc, herein not shown. Specifically, the first guide shaft 41 is slidably introduced into a bearing 43 of the optical pickup unit 4, while the second guide shaft 42 guides a roll 44 provided in the optical pickup unit 4. Each of these guide shafts 41, 42 is secured to the chassis 3 by having its both ends held by mounting members, not shown.

Outside of the first and second guide shafts 41 and 42 are provided a first bobbin 47 carrying a coil 45 and a second bobbin 48 carrying a coil 46, respectively. These first and second bobbins 47, 48 are secured to the optical pickup unit 4. A pair of yokes 49, 50, having the first bobbin 47 interposed in-between, are secured with set screws 52, 53 to the chassis 3. Similarly, a yoke 51, provided within the second bobbin 48, is secured to the chassis 3 by a set screw 54. Magnets 55, 56 are bonded to the sides of the yokes 49, 50 directed to the first bobbin 47 with an adhesive. Similarly, a magnet 57 is bonded to the side of the yoke 51 directed to the yoke 51.

Yokes 58, 59 are inserted through the first bobbin 49. These yokes are secured by set screws, not shown, to the chassis 3, with both ends of the yokes 58, 59 being abutted by a pair of yokes 49, 50. Similarly, a yoke 60 is passed through the second bobbin 48 and secured by a set screw, not shown, to the chassis 3 with both ends of the yoke 60 being abutted by another yoke 51.

The first bobbin 47 provides a magnetic circuit comprised of magnet 55—coil 45 placed around first bobbin 47—yoke 58—yoke 49—magnet 55 and another magnetic circuit comprised of magnet 56—coil 45 placed around first bobbin 47—yoke 59—yoke 50—magnet 56. Similarly, the second bobbin 48 provides a magnetic circuit comprised of magnet 57—coil 46 placed around second bobbin 48—yoke 60—yoke 51—magnet 57. The above magnetic circuits may each be reversed in the order of the magnetic circuit components.

From the above arrangement, it is seen that, by supplying the current through the coils 45 and 46 placed around the first and second bobbins 47, 48, a force according to the Fleming's law acts in the predetermined direction on each of the coils 45, 46 placed around the first and second bobbins 47, 48, respectively, as a result of which the optical pickup unit 4 is moved at a higher rate along the radius of the optical disc.

The driving unit 2, arranged as shown in Figs.4 to 6 or as shown in FIGS. 8 and 9, is mounted within the casing 1 by connecting the corners on the upper surface of the chassis 3 of the driving unit 2 and the upper edge 81 of the casing 1 by means of tension springs 82.

A shock-absorbing device 101 of the present embodiment is mounted between a lateral side 3a of the chassis 3 of the driving unit 2 and an inner lateral side of the casing 1.

Figure 10C:
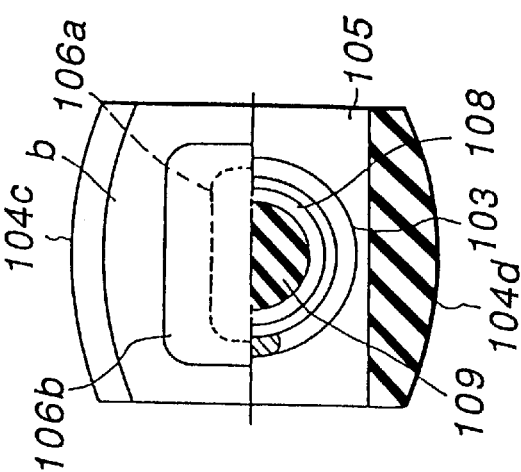
FIGS. 10A, 10B and 10C are a front view, a transverse plan cross-sectional view, and a back-side view, respectively, showing the shock absorbing device according to the present invention.
Figure 10B:
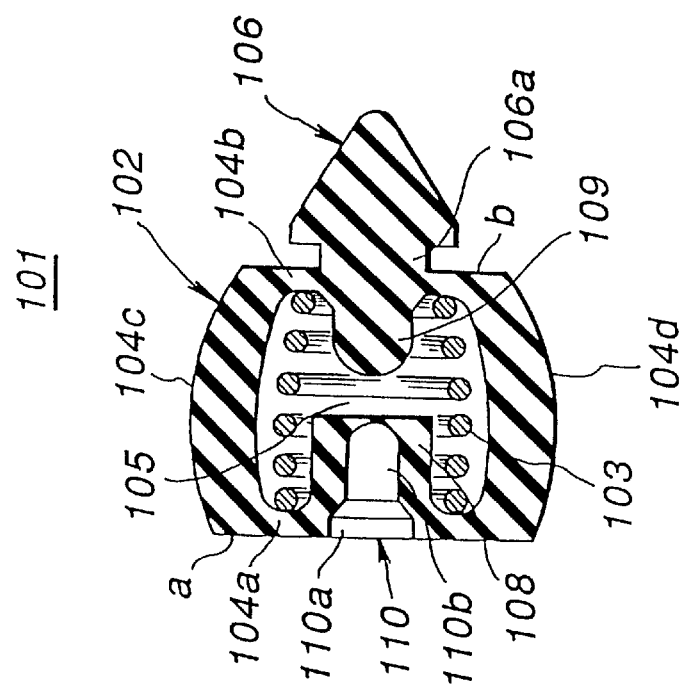
Figure 10A:
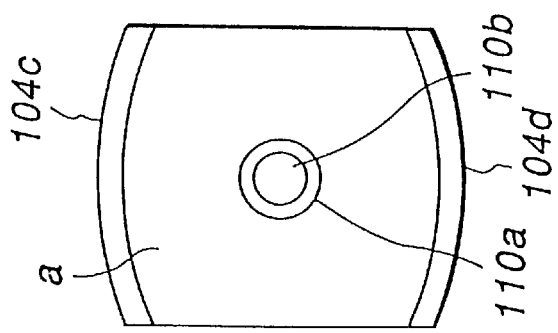

The shock-absorbing device 101 is comprised of a tubular member 102, formed of a material having a high loss coefficient and a high module of elasticity, such as rubber, and a compression spring 103 mounted within the tubular member 102, as shown in FIG. 10. The tubular member 102 has a cross-sectional profile in the form of a square made up of rubber wall sections 104a, 104b, 104c and 104d on its four sides, with a hollow mid section 105 being defined by the four wall sections, as shown in FIG. 10B. The compression spring 103 is housed within this hollow section 105.

Of these four wall sections 104a to 104d, the outer sides of the wall sections 104a, 104b facing each other serve as a mounting surface a with respect to the casing 1 and a mounting surface b with respect to the driving unit 2. The remaining wall sections 104c, 104d are convexed slightly towards the outside. Of these mounting surfaces a and b, the mounting surface b is formed with an outwardly extending protuberance 106. The protuberance 106 has a constricted portion 106a at a connecting part to the mounting surface b. It is by this constricted portion 106a that the tubular member 102 is mounted within a through-hole 107 formed in the lateral side 3a of the chassis 3 of the driving unit 2, as shown in FIG. 11.

Thus the shock absorbing device 101 is mounted on the driving unit 2 by fitting the constricted potion 106a in the through-hole 107. In consideration of the ease of assembly, a slit, not shown, which communicates with the through-hole 107 (FIG. 11), is formed from the lower end of chassis 3, and the constricted portion 106a is introduced via this slit into the through-hole 107. Meanwhile, the portion of the protuberance 106 other than the constricted portion 106a, that is the portion having a triangular cross-section 106b, plays the role of preventing the tubular member 102 from being accidentally detached from the driving unit 102.

The lateral sides of the wall sections 104a, 104b facing the hollow section 105 are formed with lugs 108, 109 for preventing the compression spring 103 from being detached accidentally. Of these lugs 108, 109, the lug 108 directed towards the wall section 104a is formed with an inner recess 110 which communicates with the mounting surface a. The recess 110 is made up of a first portion 110a of a larger diameter opening to the mounting surface a and a second portion 11b of a lesser diameter communicating with the first portion at the root of the lug 108.

Figure 11:
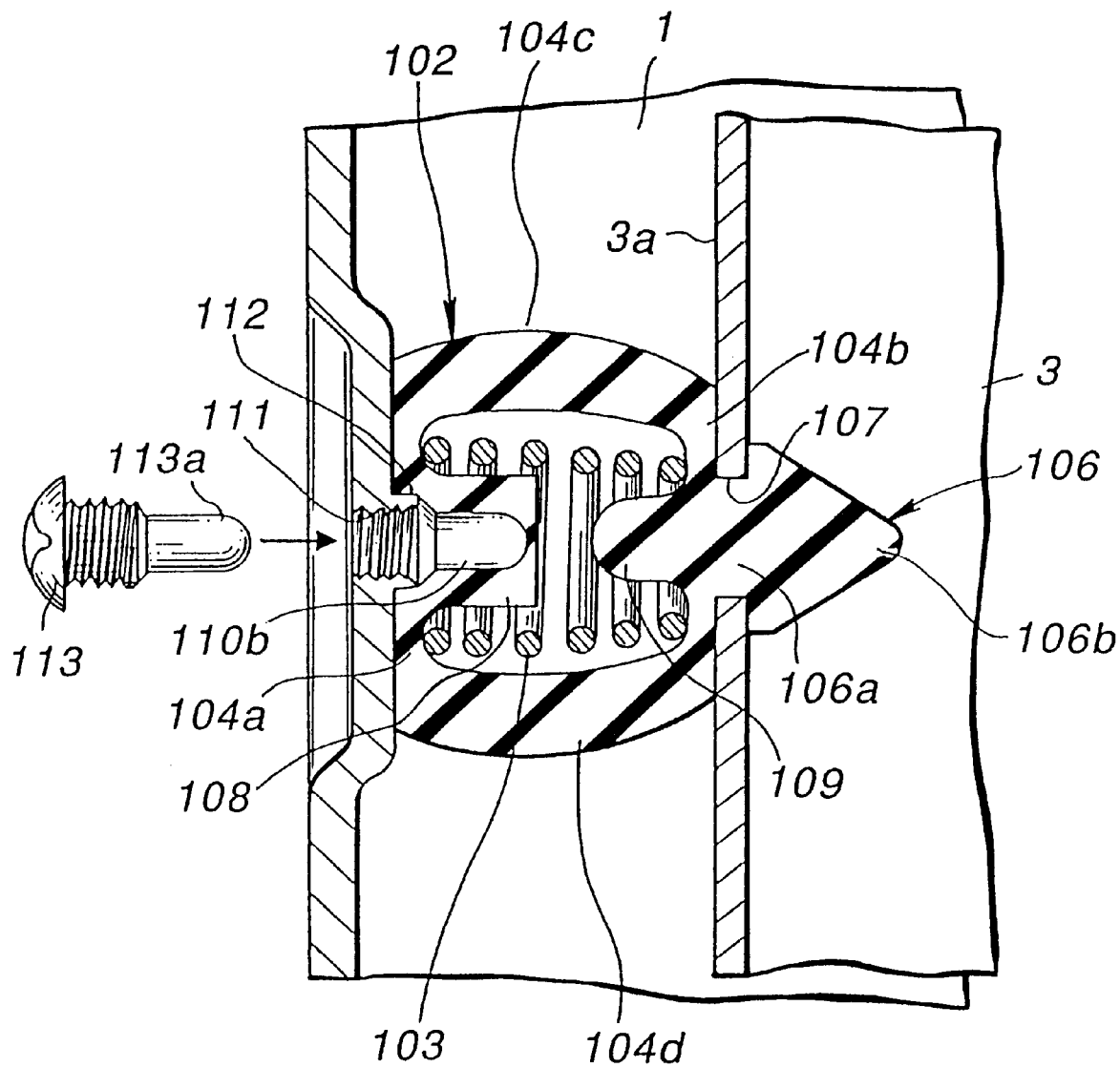
FIG. 11 is a cross-sectional view showing the mounting state of the shock absorbing device according to the present invention.

The first portion with the larger diameter 110a is designed for receiving an outer annulus 112, that is, as a recess for clearance of the outer annulus 112, as shown in FIG. 11. The outer annulus 112 is formed as a part of casing 1 protruded towards the inner side or towards the driving unit and has a tapped hole 111. The second portion with the lesser radius 110b is a recess for receiving an end 113a of a set screw 113 introduced into the tapped hole 111 from outside the casing 1, as shown in FIG. 11. Consequently, when attaching the tubular member 102 to the casing 1, the outer annulus 112 of the casing 1 is fitted into the first portion 110a for positioning the tubular member 102 with resect to the casing 1, and subsequently the set screw 113 is threaded into tapped hole 111 from outside the casing 1. That is, the tubular member 102 is mounted on the casing 1 by the end 113a of the set screw 113 fitted in the recess 110b of the tubular member 102.

Figure 12:
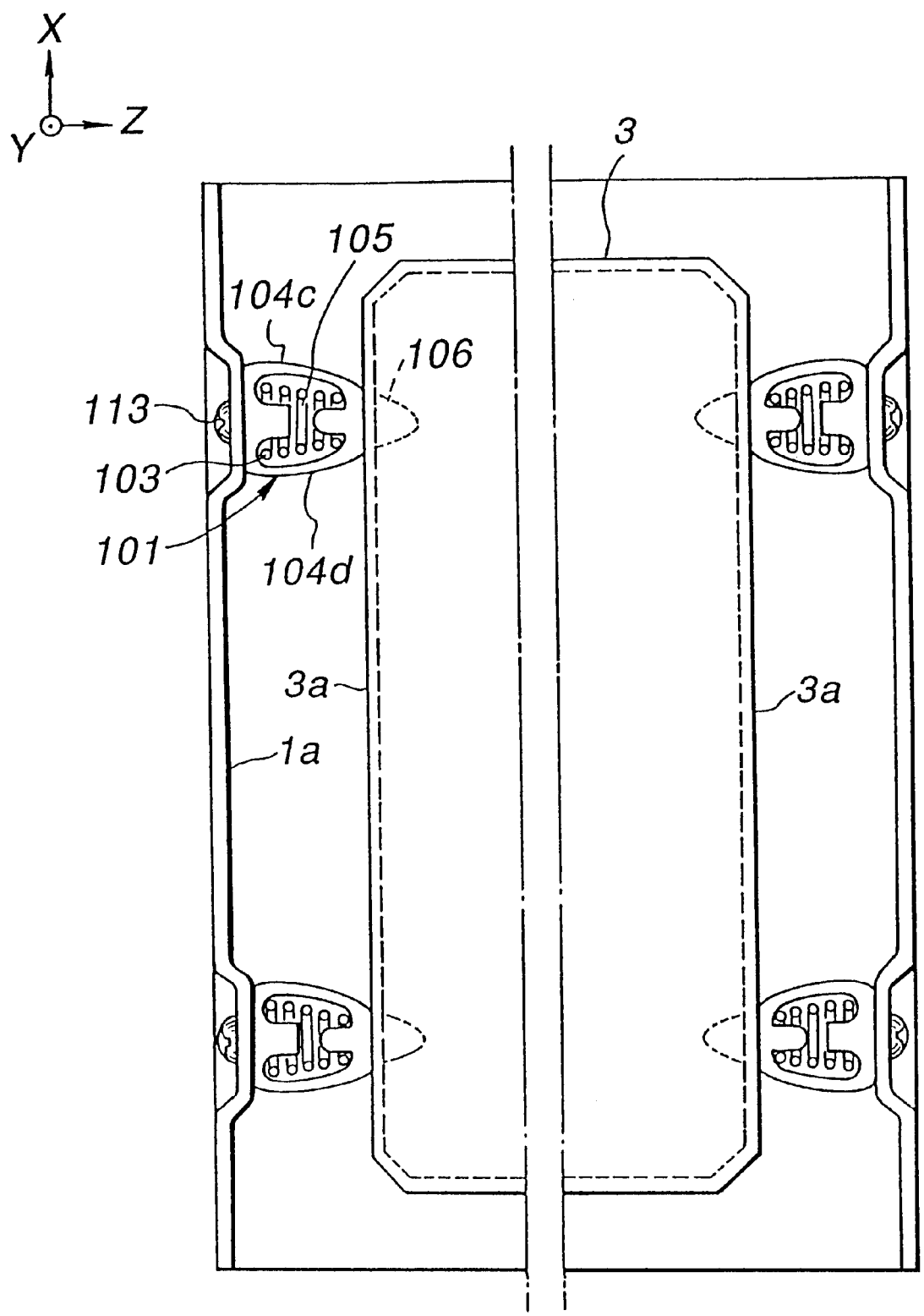
FIG. 12 is a plan view showing essential parts of a playback apparatus for an optical disc mounting the shock absorbing device according to the present invention.
Figure 13:
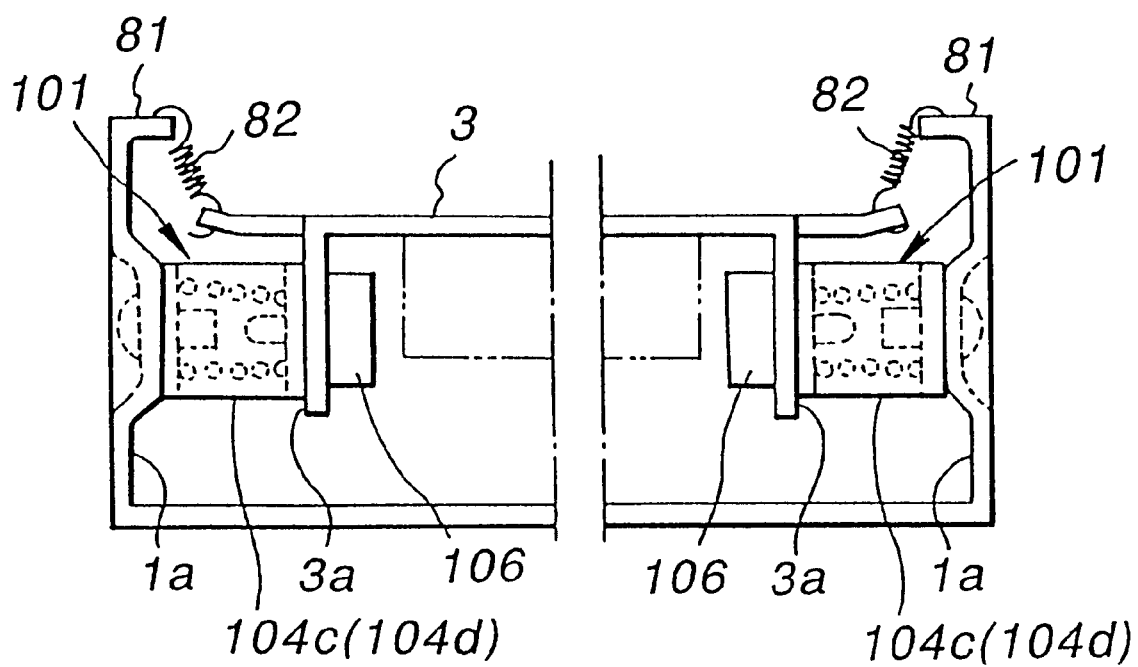
FIG. 13 is a front view showing essential parts of the playback apparatus for an optical disc mounting the shock absorbing device according to the present invention.

Two of the above-described shock absorbing devices 101 are mounted on each of the left and right lateral sides 3a of the chassis 3 of the driving unit 2 lying parallel to an x axis which is the direction of movement of the optical pickup unit 4 in the driving unit 2, as shown in FIG. 12. The shock absorbing devices 101 are mounted at this time so that the convexed wall sections 104c and 104d are arrayed along the x axis. Consequently, with the direction of movement of the bobbin 72 in the optical pickup unit 4 (FIG. 7) being the direction of the y axis and the direction connecting the driving unit 2 or the lateral side 3a of the chassis 3 to the casing 1 or the inner lateral side 1a being the direction of the z axis, the axial direction of the hollow section 105 of the tubular member 102 is parallel to the y axis and that of the compression spring 103 is parallel to the z axis (FIG. 13).

In other words, the direction of the x axis is the direction of flexure of the wall sections 104c and 104d, the direction of the y axis is the shearing direction of the wall sections 104c and 104d and the direction of the z axis is the direction of compression or buckling of the wall sections 104c and 104d and the direction of extension and compression of the compression spring 103.

It is noted that the damper 101 has a spring constant or force constant Kx along the direction of the x axis which is the smallest, a spring constant or force constant Ky along the direction of the y axis and a spring constant or force constant Kz along the direction of the z axis which is the largest in this order (Kx<Ky<Kz). In general, the smaller the spring constant, the lower becomes the natural frequency of a member subject to vibration, herein the driving unit 2 and hence the larger the difference between the vibrations or shocks exerted on the casing 1 and the natural frequency of the driving unit 2, so that transmission of the vibrations or shocks to the driving unit 2 may be inhibited effectively.

The direction of the x axis is the direction of adjustment of tracking servo of the optical pickup unit 4 with respect to the optical disc, as mentioned previously. This direction is a direction for which utmost accuracy is demanded in reproducing information signals. Since the spring constant Kx along the direction of the x axis is smallest with the shock absorbing device of the present invention, the vibrations or shocks transmitted from the casing 1 to the driving unit 2 along the x axis may be minimized.

If the mechanism of the driving unit 2 for moving the optical pickup unit 4 is arranged as a linear motor, a shown in FIGS. 8 and 9, the optical pickup unit 4 may be moved at an elevated speed. However, it becomes extremely difficult to stop the optical pickup unit 4 at a desired position due to the force of inertia accompanying its movement. The usual practice is to control the driving current supplied to the linear motor by a control circuit, not shown, for stopping the optical pickup unit 4 at the desired position.

However, if the vibrations or shocks applied to the casing 1 are transmitted to the driving unit 2, the optical pickup unit 4 is slightly shifted, due to the force of inertia generated by disturbances, such as the above vibrations or shocks, even though the driving current is controlled by the control current, such that the optical pickup unit 4 cannot be stopped at the desired position. With the present embodiment, since the vibrations or shocks exerted in the direction of the x axis may be minimized, as described above, the optical pickup unit 4 is not affected by disturbances, such as the vibrations or shocks, so that the optical pickup unit 4 may be stopped at the desired position by controlling the driving current flowing through the control circuit.

The direction of the y axis is the direction of movement of the bobbin 72 in the optical pickup unit 4 (FIG. 7) or the direction of adjustment of the focusing servo control of the object lens 77 and hence is a direction for which the degree of accuracy next to that for the above-mentioned x axis direction is demanded in reproducing information signals. With the shock absorbing device of the present embodiment, since the spring constant Ky for the y axis direction is the second smallest, that is smaller only than the spring constant Kx for the x axis direction, the vibrations and shocks along the y axis direction may be positively diminished, although to a lesser extent than with those along the x axis direction.

Finally, the direction of the z axis is a direction along which the driving unit 2 is displaced downwards under gravity when the casing 1 is set from the horizontal position to the vertical position, that is to the position in which the optical disc surface is parallel to the vertical direction. In this direction, the degree of accuracy demanded for the z axis direction is not so high as that for the x and y axes. However, if the vibrations and shocks are produced in the z axis direction, the position of the cartridge inserting opening provided in the casing 1 is offset from the position of the driving unit 2, because the playback apparatus has a cartridge inserting type caddie system loading unit, so that the optical disc housed within the cartridge main body cannot be loaded on the turntable 23 of the spindle motor 5 of the driving unit 2.

Figure 14:
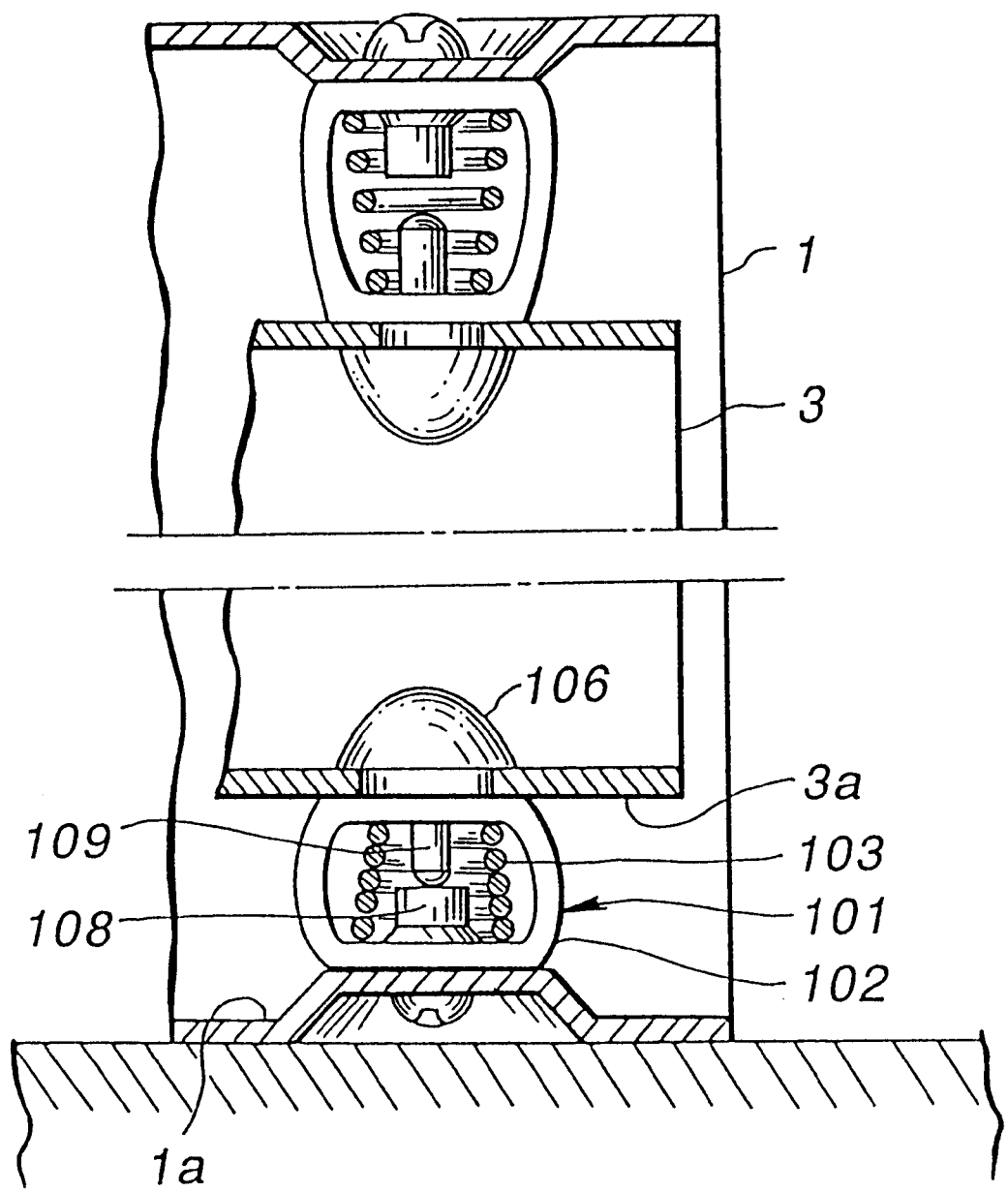
FIG. 14 is a cross-sectional view showing essential parts of the playback apparatus mounting the shock absorbing device according to the present invention, with the playback apparatus being shown in a vertically oriented position.

However, with the shock absorbing device 101 of the present embodiment, since the spring constant Kz along the direction of the z axis is maximum, the driving unit 2 may be supported sufficiently within the casing 1 so that it becomes possible to prevent the driving unit 2 from being displaced downwards significantly. Above all, two lugs 108, 109 protruded in a direction of approaching each other are provided within the hollow part 105 of the tubular member 102, so that, if, with the casing 1 placed in a vertical position, the driving unit 2 is displaced downwards against the force of restoration of the compression spring 103, the lugs 108, 109 of the shock absorbing device 101 disposed at a lower position are contacted with each other, as shown in FIG. 14, to inhibit further descent of the driving unit 2 (chassis 3). Since the descent of the driving unit 2 is limited to a small gap between the lugs 108 and 109, it becomes possible to limit the offset between the cartridge inserting opening in the casing 1 and the driving unit 2 to the above-mentioned small gap. Consequently, it becomes possible to avoid a situation that the optical disc housed within the cartridge main body cannot be loaded on the turntable 23 of the spindle motor 5 of the driving unit 2.

It will be seen from the foregoing that the present invention provides an arrangement of the shock absorbing device in which the spring constants Kx, Ky and Kz are selected in accordance with the degree of accuracy demanded in the direction of tracking servo adjustment, the direction of focusing servo adjustment and the mounting conditions of the casing 1, that is, depending on whether the casing is mounted in a horizontal or vertical position. Such arrangement in its entirety is equivalent to insulating the transmission of the vibrations or shock from the casing 1 to the driving unit 2.

Consequently, it becomes possible, with the playback apparatus fitted with the present shock absorbing device, to reproduce information signals from the optical disc positively and accurately despite the vibrations or shocks applied to the casing 1 or changes in the mounting state of the casing 1.

It is to be noted that, although the driving unit 2 is designed for the read-only optical disc, the present invention may also be applied to a re-recordable optical recording medium or a magneto-optical recording medium on which the information signals may be re-recorded by light or magnetic field modulation.

What is claimed is:

1. A recording and/or reproducing apparatus for operating on a disc positioned with a disc cartridge, the recording and/or reproducing apparatus comprising:

an optical unit radially movable across the disc that radiates a laser light beam on a recording surface of the disc, the optical unit including a bobbin perpendicularly movable with respect to the surface of the disc;

a driving unit that positions and rotates the disc;

a chassis that supports the optical unit and the driving unit;

an outer casing;

a plurality of dampers connected between the outer casing and the chassis, each damper including a tubular member and a compression spring mounted within the tubular member, and having a first spring constant along the longitudinal axis of the spring, a second spring constant different from the first spring constant along a second axis which is perpendicular to the longitudinal axis, and a third spring constant different from the first spring constant and the second spring constant along a third axis which is perpendicular to the longitudinal axis and the second axis, and coplanar with the second axis.

2. The apparatus as claimed in claim 1 wherein the magnitude of the second spring constant is greater than the magnitude of the third spring constant, and the magnitude of the first spring constant is greater than the magnitude of the second spring constant.

3. The apparatus as claimed in claim 2 wherein the radial movement of the optical unit across the disc coincides with the third axis.

4. The apparatus as claimed in claim 2 wherein the movement of the bobbin coincides with the second axis.

5. The apparatus as claimed in claim 1 wherein each tubular member includes a top section, a bottom section, and a pair of wall sections connected to the top section and the bottom section to define a hollow section therebetween.

6. The apparatus as claimed in claim 5 wherein the top section, the bottom section, and the pair of wall sections comprise rubber.

7. The apparatus as claimed in claim 5 wherein the pair of wall sections are convexed with respect to the hollow section.

8. The apparatus as claimed in claim 7 wherein a first line, drawn normal to a second line drawn perpendicular to the outer casing and tangent with an outermost convex portion of one of the pair of wall sections, is parallel to the third axis.

9. The apparatus of claim 5 wherein the compression spring includes a first end and a second end, the compression spring being interposed within the hollow section so that the first end abuts on the top section and the second end abuts on the bottom section.

10. The apparatus of claim 5 wherein the longitudinal axis of the compression spring of each of the dampeners are connected between the outer casing and the chassis in parallel.

11. The apparatus as claimed in claim 1 wherein the longitudinal axis of the compression spring is perpendicular to the outer casing and the chassis where the dampener connects to the outer casing and the chassis.

12. A recording and/or reproducing apparatus for operating on a disc positioned with a disc cartridge, the recording and/or reproducing apparatus comprising:

an optical unit radially movable across the disc that radiates a laser light beam on a recording surface of the disc, the optical unit including a bobbin perpendicularly movable with respect to the surface of the disc;

a driving unit that positions and rotates the disc;

a chassis that supports the optical unit and the driving unit;

an outer casing;

a plurality of dampers connected between the outer casing and the chassis, each damper including a tubular member and a coiled spring mounted within the tubular member, each damper having a first force constant along the longitudinal axis of the spring, a second force constant different from the first force constant along a second axis which is perpendicular to the longitudinal axis, and a third force constant different from the first force constant and the second force constant along a third axis which is perpendicular to the longitudinal axis and the second axis, and coplanar with the second axis.

13. The apparatus as claimed in claim 12 wherein the magnitude of the second force constant is greater than the magnitude of the third force constant, and the magnitude of the first force constant is greater than the magnitude of the second force constant.

14. The apparatus as claimed in claim 13 wherein the radial movement of the optical unit across the disc coincides with the third axis.

15. The apparatus as claimed in claim 13 wherein the movement of the bobbin coincides with the second axis.

16. The apparatus as claimed in claim 12 wherein each tubular member includes a top section, a bottom section, and a pair of wall sections connected to the top section and the bottom section to define a hollow section therebetween.

17. The apparatus as claimed in claim 12 wherein the longitudinal axis of the compression spring is perpendicular to the outer casing and the chassis where the dampener connects to the outer casing and the chassis.

18. The apparatus as claimed in claim 12 wherein each tubular member includes a top section, a bottom section, and a pair of wall sections connected to the top section and the bottom section to define a hollow section therebetween, the bottom section having an outwardly extending protuberance, the protuberance having a connecting portion and a triangularly shaped holding portion.

* * * * *